United States Patent [19]
Van Lerberghe

[11] Patent Number: 6,040,081
[45] Date of Patent: Mar. 21, 2000

[54] FLAT BATTERY ELEMENT HAVING CURVED CONTACTS

[75] Inventor: Steven Van Lerberghe, Le Mans, France

[73] Assignee: U.S. Philips Corporation, New York, N.Y.

[21] Appl. No.: 08/891,339

[22] Filed: Jul. 10, 1997

[30] Foreign Application Priority Data

Jul. 10, 1996 [FR] France .................................. 96 08622

[51] Int. Cl.⁷ .................................................. H01M 2/14
[52] U.S. Cl. .......................... 429/131; 429/162; 429/124; 429/127
[58] Field of Search ..................... 429/162, 131, 429/124, 127

[56] References Cited

FOREIGN PATENT DOCUMENTS 0176597A   4/1986   European Pat. Off. .
0397248A   11/1990  European Pat. Off. .
2198877A   6/1988   United Kingdom .

OTHER PUBLICATIONS

Japanese Abstract, vol. 004, No. 181 (E–037), Dec. 13, 1980 and jp 55124950 a (Matsushita Electric Ind Co Ltd), Sep. 1980, Abrege.

Japanese Abstract, vol. 014, No. 229 (E–0928), May 15, 1990 and JP 02 060071 a (Shin Kobe Electric Mach Co Ltd), Feb. 29, 1990, Abrege, Figure 3.

Primary Examiner—Maria Nuzzolillo
Assistant Examiner—Laura Weiner
Attorney, Agent, or Firm—Dicran Halajian

[57] ABSTRACT

A battery is disclosed having two electrodes, each with a conductive strip connected thereto. A separator separates the two electrodes and an insulating envelope encloses the two electrodes. The two electrodes extend from openings of the insulating envelope and curve over the envelope toward the battery center.

6 Claims, 7 Drawing Sheets

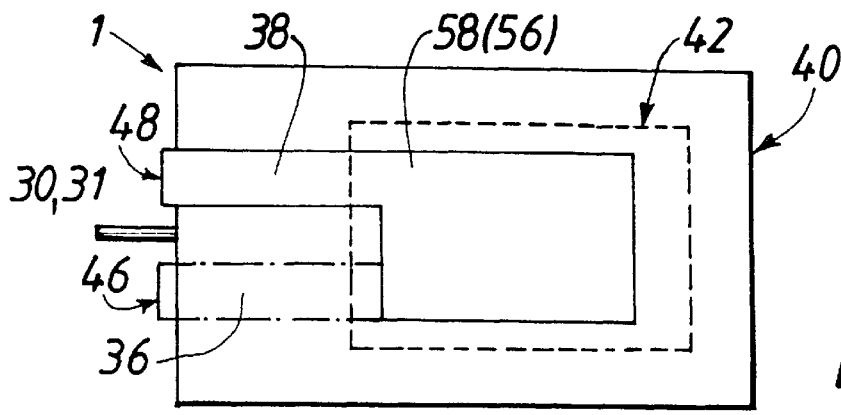
FIG.7A
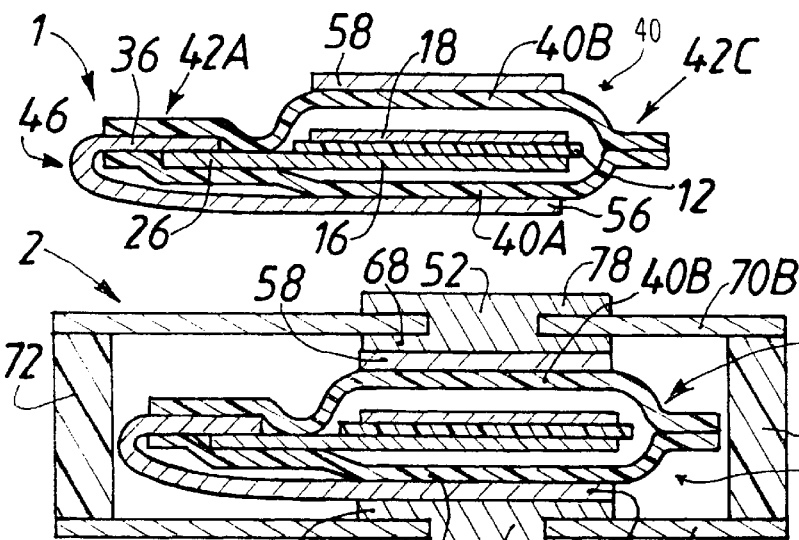
FIG.7B
FIG.7C
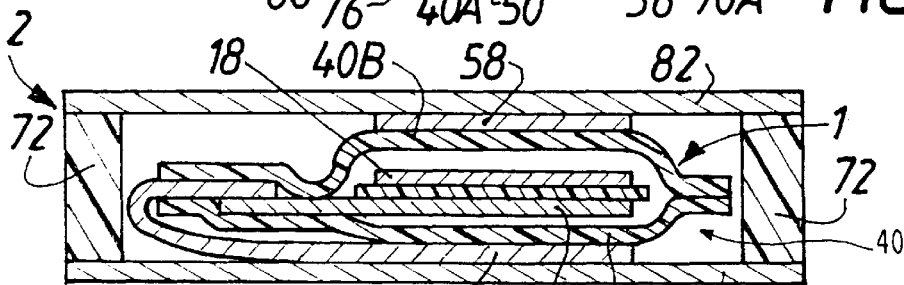
FIG.7D
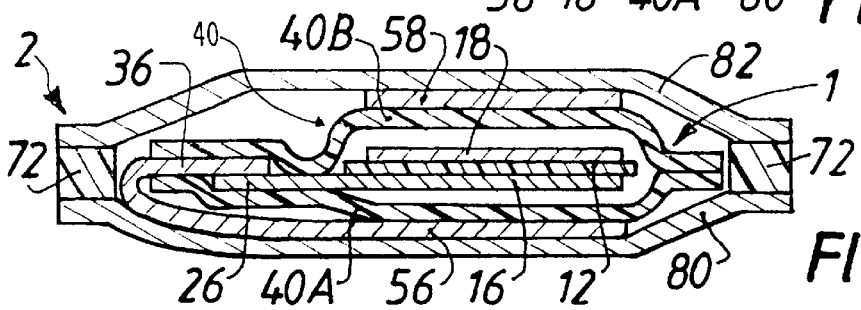
FIG.7E 6,040,081

FLAT BATTERY ELEMENT HAVING CURVED CONTACTS

FIELD OF THE INVENTION

The invention relates to a flat battery element comprising an electrochemical elementary cell having plane electrodes of opposite polarities and provided with contact zones and an electrolyte under pressure, and an envelope for accommodating the electrochemical cell.

The invention also relates to an assembly of such battery elements, and to a thin card including such a flat battery element.

The invention is used in the manufacture of portable apparatuses and particularly in the manufacture of wireless telephone terminals.

BACKGROUND OF THE INVENTION

An envelope for a flat battery element is known from patent application EP 0 176 597 of Mar. 29, 1984 (SEALED BATTERY). This document describes a flat battery element having electrodes and an electrolyte enclosed in an envelope. The electrodes have contact zones for their connection with external contact pins, and to this end extend through an impervious sealing zone of the pocket and pass beyond the exterior of the envelope. The envelope is enclosed in a housing constituted by two shells which are sealed at their edges and thus ensure a pressure on the walls of the envelope. One of the shells of the housing is provided with input/output pins arranged in a part which is not under pressure. The connection between said pins and the contact zones of the electrodes is made directly outside the envelope and also inside the housing.

SUMMARY OF THE INVENTION

It is an object of the invention to provide a flat battery element comprising an electrochemical elementary cell, for example of the lead-acid type.

A technical problem in a lead-acid electrochemical cell is that the electrolyte, which may be sulfuric acid, must be used in a substantially saturated state and under a certain internal pressure which is higher than the atmospheric pressure, and that this pressure must be maintained in the cell during its normal state of operation. Another technical problem is that the electric connections with the contact zones of the electrodes must be made outside the pocket so as to prevent possible chemical reactions between the material of the connections and the electrolyte. Another technical problem is that the material for establishing these connections of the contact zones of the electrodes must have a very high mechanical resistance, which is not generally the case.

The inventive battery element solves the problems of conventional batteries described above.

An advantage is that the material of the strips may be chosen to be such that the connection between the contact zones and the input/output electric contact means is strengthened.

A technical problem also resides in the fact that a single electrochemical cell does not always furnish the desired voltage value. This problem is solved by means of an assembly of flat battery elements.

The fact that there is a demand for electric batteries which have improved properties of strength so that they can be easily placed in a wireless apparatus and have free electric contact zones, is another technical problem which is solved by means of a thin card according to the present invention.

BRIEF DESCRIPTION OF THE DRAWINGS

A battery element, an assembly of flat battery elements and a thin card will hereinafter be described in greater detail with reference to the accompanying drawings.

FIG. 7A is a plan view of a battery element having a pinched envelope, with contact strips folded about the walls of the envelope and lengthened by contact pins; FIG. 7B shows the battery element of FIG. 7A in a sectional view along the lower contact strip; FIG. 7C is a sectional view of a thin card including the battery element of FIG. 7A with contact and pressure pieces, FIGS. 7D and 7E are sectional views of two embodiments of a thin card including this battery element and having conducting walls.

DETAILED DESCRIPTION OF THE INVENTION

Figure 1A:
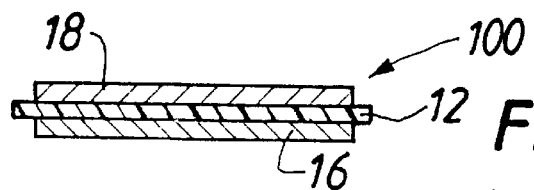
FIG. 1A shows an electrochemical cell in a simple cross-sectional view.
Figure 1B:
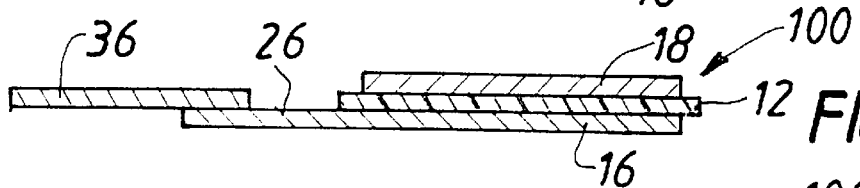
FIGS. 1B and 1C shows this electrochemical cell in a cross-sectional view in a contact zone of the first electrode and the second electrode, respectively.
Figure 1C:
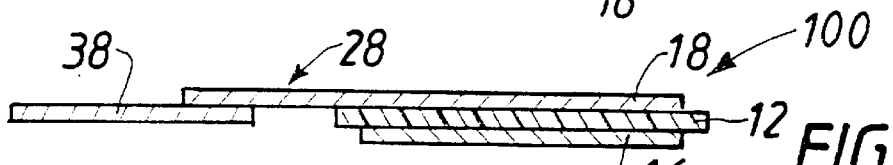

FIGS. 1A, 1B and 1C show an elementary electrochemical cell 100 with an acid electrolyte for constituting a battery element 1 which comprises, in a cross-sectional view, two thin films of an electrochemically active conducting material constituting electrodes 16, 18 of different polarities and a thin separator film 12 provided with an acid electrolyte. In FIG. 1A, the separator 12 extends beyond the films constituting the electrodes 16, 18. The electrochemical cell 100 is thus of a thin and flat type having conducting films for forming substantially thin and flat electrodes which are separated from each other by a small space occupied by the separator 12 which is a substantially thin and flat layer.

FIGS. 1D and 1C show the films which constitute the electrodes 16, 18 and have projections 26, 28 for forming contact zones referred to as electric contact lugs which are offset with respect to each other. These contact lugs 26, 28 are preferably connected to conducting strips 36, 38 by way of soldering or by any other method.

Figure 2:
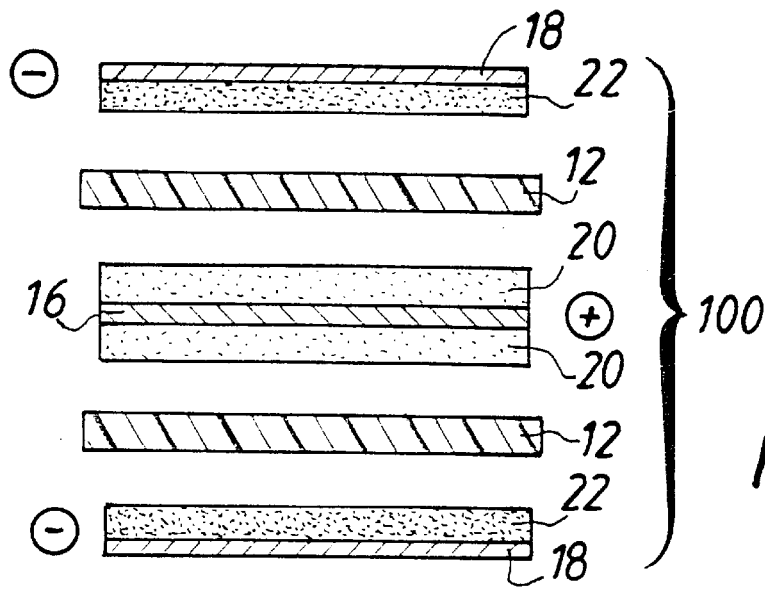
FIG. 2 is a simple cross-sectional view of an embodiment of an electrochemical cell of the lead-acid type.

FIG. 2 shows a preferred embodiment of the electrochemical cell 100 of the lead-acid type in the form of thin layers for forming a thin and flat elementary cell.

Products for manufacturing cells are well-known to those skilled in the art from the publication: "Handbook of Batteries", 2nd edition, David Lindon. It is known from this document that lead-acid batteries have high qualities of power and rechargeability, i.e. this type of battery is rechargeable and the charge is stable during a considerable period of time.

As is shown in FIG. 2, an electrochemical cell of the lead-acid type which is capable of realizing a flat battery element comprises, ultra-thin films 16, 18 of an electrochemically active metal, preferably of lead; a cladding consisting of an electrochemically active compound 20, 22 on one face or on two faces of said active metal films; a separating material 12 for absorbing an electrolyte which may be contained in a sealed system to be described hereinafter, constituting said flat battery element which encloses the electrochemical cell.

The association of the active metal films 16, 18 with the active compound cladding 20, 22 constitutes plates of negative or positive polarity which are separated from each other by the separating material 12.

Projections 26 and 28 of the films 16, 18 are not clad with an active compound 20, 22 so as to realize electric contact lugs. The separator 12 extends beyond the compound-clad parts of each positive and negative plate. The positive and negative plates are arranged in such a way that the unclad parts for forming the contact lugs do not face each other or alternate with each other.

FIG. 2, in conjunction with FIGS. 1A–1C, show a negative plate which is constituted by a metallic layer 18 and a contact zone 28, and is clad with a compound 22 on one face. This first negative electrode is separated from a positive electrode by the separator 12. The positive electrode comprises a thin metallic film 16 and a contact zone 26, and is clad with compound 20 on its two faces. This positive electrode 16, with contact zone 26, is separated from the next negative electrode by a separator 12. The next negative electrode is constituted by a metallic film 18, with contact zone 28, and a compound cladding 22 facing the separator 12. Such a cell 100 thus comprises two negative plates and one common positive plate, thus constituting two elementary cells arranged substantially parallel and having a common electrode.

In a lead-acid cell 100, the films 16, 18 preferably consist of 99.99% of lead. For a lead-acid electrochemical cell, there are many possible active compounds which are already known in the art. For example, PbO and $Pb_3O_4$ compounds may be used for the positive plates 16 and the PbO compound may be used for the negative plates 18. The separator 12 may be made of highly absorbing glass fibers. The electrolyte may be sulfuric acid. The electrolyte concentration in the cell is established by adding an excess of electrolyte in tile sealed system. Au exhaust system is provided in the sealed system for eliminating the excess gases when the internal pressure exceeds a certain level. In the sealed system containing the lead-acid electrochemical cell, the electrolyte is in a substantially saturated state and a certain internal pressure which is higher than the atmospheric pressure should be maintained in the normal state of operation of the cell. In the sealed system, an electrochemical cell of the type shown in FIG. 2 is maintained in such a way that the volume between the compressed separator and the active material is substantially filled up and that there is no free electrolyte.

An advantage of these electrochemical cells is that they can have a very large number of charge and discharge cycles. These cells may be recharged at a higher rate as compared with other known cells.

In embodiments of the electrochemical cells, the active zones of the electrodes may have dimensions of approximately 44 mm by 57 mm; the positive two-layer plate may have a thickness of 0.254 mm; the one-layer negative or positive plate may be 0.152 mm thick; the separator at a pressure of 55 g per $m^2$ may have a thickness of 0.191 mm. This leads to a cell 100 having a thickness of approximately 1 mm. This lead-acid cell is capable of supplying a voltage of 2 V. The electrodes of the same polarity are interconnected.

FIGS. 3A–C and 4A–C show a flat bakery element 1 for forming a sealed system for an electrochemical cell containing an acid electrolyte, such as a lead-acid electrochemical cell 100.

This flat battery 1 comprises an encapsulating envelope 40 containing the electrochemical cell 100. This envelope is realized by means of a flexible thin film of an insulating material which is inert and impervious to constituents of said cells and to external agents. This envelope, which is also referred to as balloon or pouch, comprises impervious passages for the contact lugs 26, 28 of the electrodes 16, 18 and also comprises an impervious passage for an exhaust 30, 31 described hereinbefore as an essential element of the acid electrolyte electrochemical cell 100.

This exhaust may be constituted by a pipe 30 provided with a removable plug 31 which may serve as a safety valve when the pressure in the enclosure of the envelope exceeds a safety limit, and it may serve as a refill opening for the acid electrolyte.

To form this envelope 40, the flexible thin film has an impervious closure zone 42 via which the impervious passages for the contact lugs 26, 28 and the impervious passage for the exhausts 30, 31 extend.

Figure 3A:
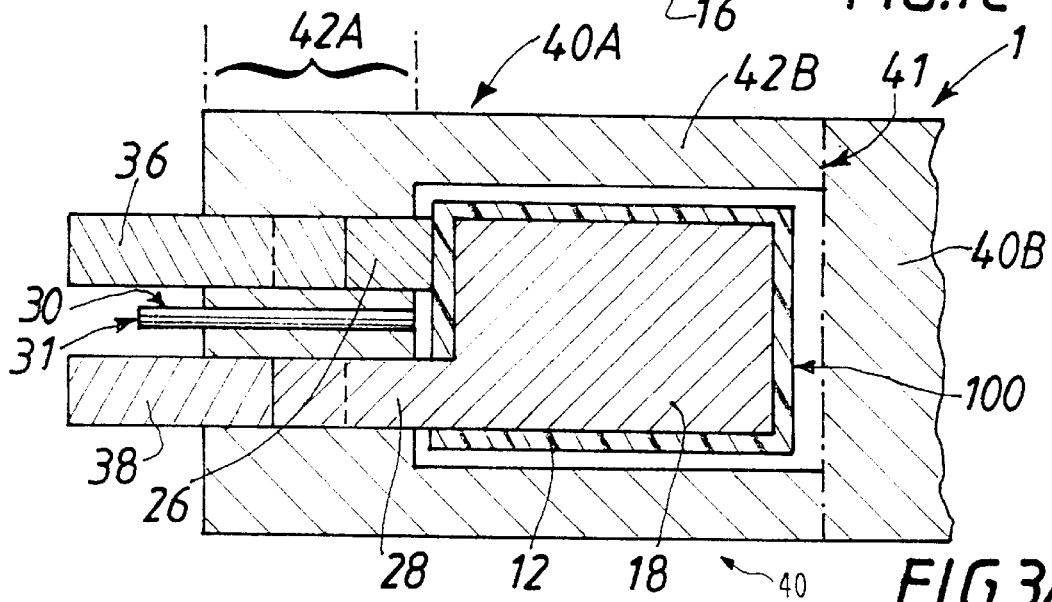
FIG. 3A is a plan view of a battery element with an envelope having a single folded part before sealing.

FIG. 3A is a plan view of the film constituting the envelope 40 after sealing, which film consists of a single part having a fold 41. This film thus forms on both sides of the fold 41 a lower part 40A of the envelope on which the electrochemical cell 100 is provided, and an upper part 40B of the envelope which, after folding, covers the lower part 40A of the envelope. The electrochemical cell 100 is sandwiched between the lower and upper envelope parts 40A, 40B which are sealed at their periphery 42, except at the fold 41, in said impervious closure zone so as to form the sealed system.

The strips 36, 38 sealed to the respective contact zones 26, 28 may consist of a metal which is different from the metal for the electrodes. In this case, the metal for the strips must not be in contact with the acid electrolyte; to avoid this contact, the strips 36, 38 are sealed to contact lugs 26, 28 outside the internal zone of the envelope containing the liquid electrolyte. The sealing zone between the contact lugs 26, 28 and the strips 36, 38 is preferably sandwiched in an impervious closure zone 42A of the envelope through which the contact lugs 26, 28 extend. To this end, this impervious closure zone 42A may be more extended than the other impervious closure zones 42B so as to completely encapsulate the sealing zone between the lugs 26 and 28 and the strips 36, 38.

Figure 3B:
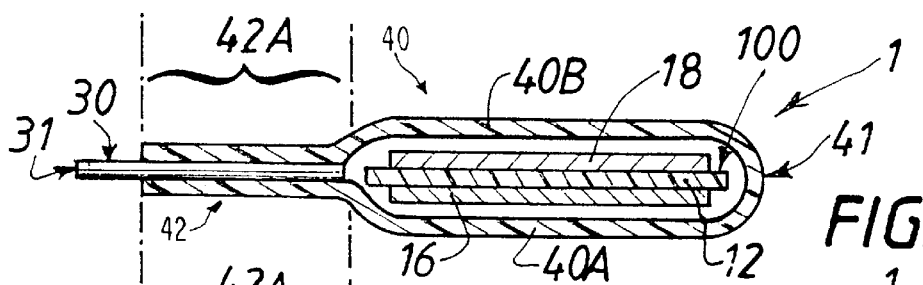
FIGS. 3B and 3C show the battery element of FIG. 3A after sealing of the external rims of the folded envelope in a cross-sectional view along an exhaust and along an electrode contact zone, respectively.
Figure 3C:
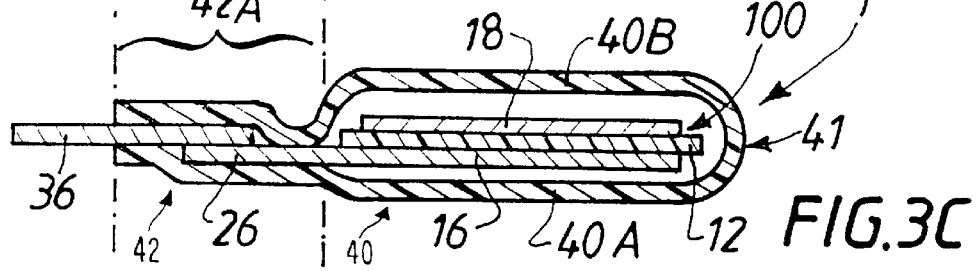

FIGS. 3B and 3C are cross-sectional views of the battery element 1 comprising the electrochemical cell 100 and the lower and upper envelope parts 40A, 40B, folded at 41 and sealed in the zone 42 for leaving an impervious passage to the exhaust 30, 31 via the zone 42A as shown in FIG. 3B, and for leaving an impervious passage to the lugs 26, 28 provided with strips 36, 38 via the zone 42A, as is shown in FIG. 3C. The lower and upper envelope parts 40A, 40B are substantially parallel to the plane of the electrode 16, 18. They are not sealed to these electrodes. When the cell 100 in the battery element 1 is under pressure, they will be very close to these electrodes.

Any arrangement of the exhausts and electric contacts other than those shown in FIGS. 3A–C is possible.

Figure 4A:
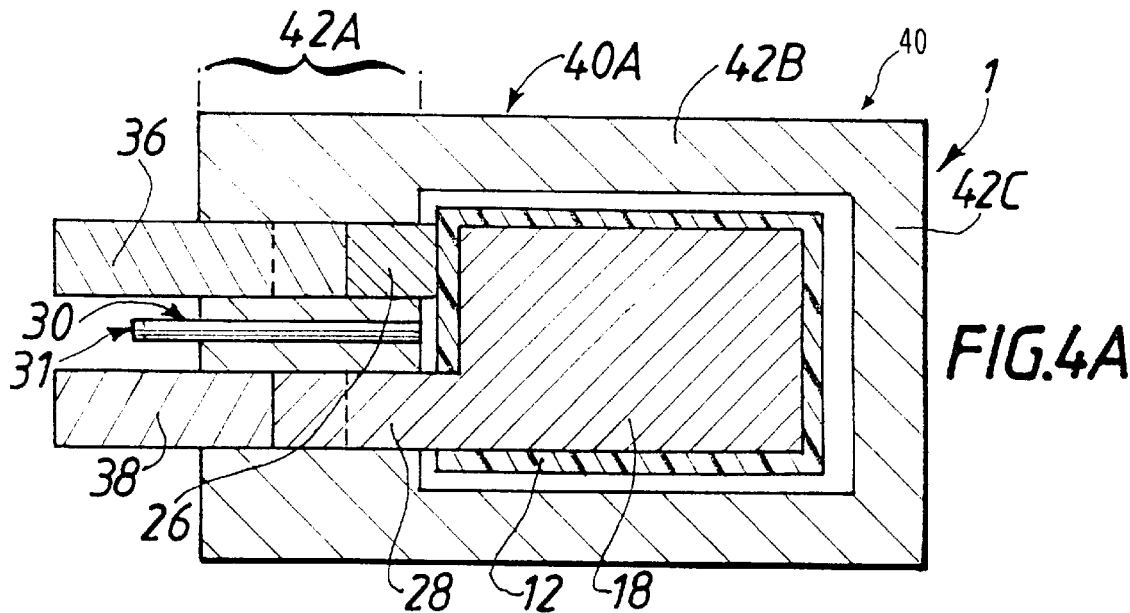
FIG. 4A is a plan view of a battery element with an envelope consisting of two pinched parts before sealing.

FIG. 4A is a plan view of the film constituting the envelope and consisting of two parts. The cell 100 is arranged as described with reference to FIGS. 3A–C. The only difference is that in this embodiment the impervious closure zone 42 extends completely around the cell, at 42A, 42B and 42C.

Figure 4B:
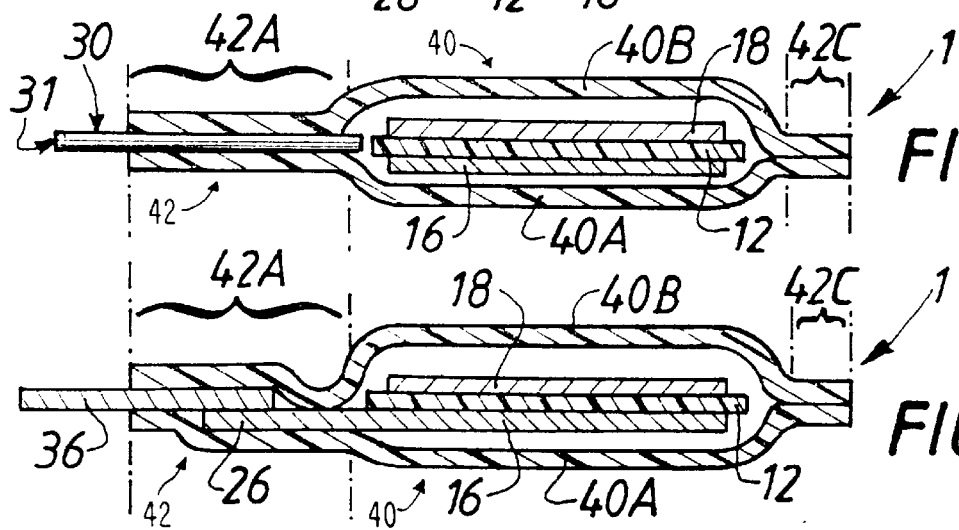
FIGS. 4B and 4C show this battery element after sealing of the external rims of the pinched envelope in a cross-sectional view along an exhaust and along an electrode contact zone, respectively.
Figure 4C:
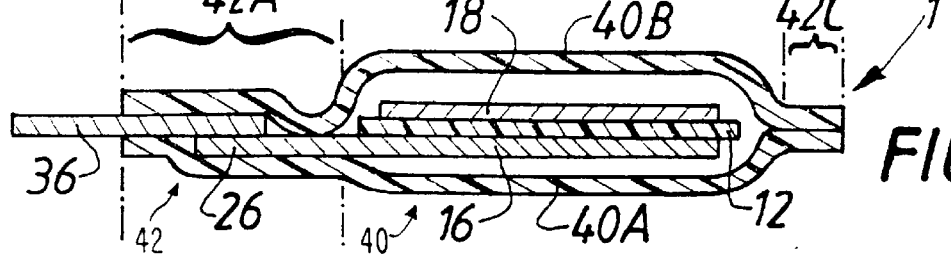

In FIGS. 4B and 4C, the exhausts 30, 31 and the contact lugs 26, 28 provided with strips 36, 38 extend in an impervious manner through the closure zone 42A. The fold shown in FIGS. 3A–C is replaced by the impervious closure zone 42C.

The flexible thin film for realizing the envelope 40 may be, for example, a polymer or an ethylene copolymer, a polyethylene, or a polypropylene. Tile flexible thin film may be made of a thermosolderable synthetic material, or the impervious sealing zones may be sealed by means of an adhesive. The flexible thin film may be, for example, a commercially available multilayer synthetic material.

A battery element 1 thus realized has the advantage that it is both impervious, due to the properties of the envelope 40, and can be opened by means of the exhausts 30, 31.

To obtain a normal operation of the cell 100 in the envelope 40, constituting the battery element 1, the electrolyte must be held under pressure. To this end, the envelope 40 of the battery element is submitted to pressure means.

These pressure means are constituted by the walls 70A, 70B or 80, 82 of a housing constituting a thin card 2 as shown in FIGS 7B–7E.

FIGS. 5A–5D and 6A–6D show this thin card 2 which comprises a first cover foil 70A and a second cover foil 70B which are substantially parallel to the lower and upper walls, respectively, of the envelope 40 of the battery element 1. These cover foils 70A, 70B are arranged to exert a pressure on these lower and upper walls of the envelope so that the necessary pressure can be applied w the acid electrolyte.

To this end, the cover foils have a central zone for accommodating the battery element and a sealing zone at their periphery. This sealing is not necessarily impervious, because the imperviousness of the cell 100 is realized by the envelope 40 of the battery element 1.

Figure 5A:
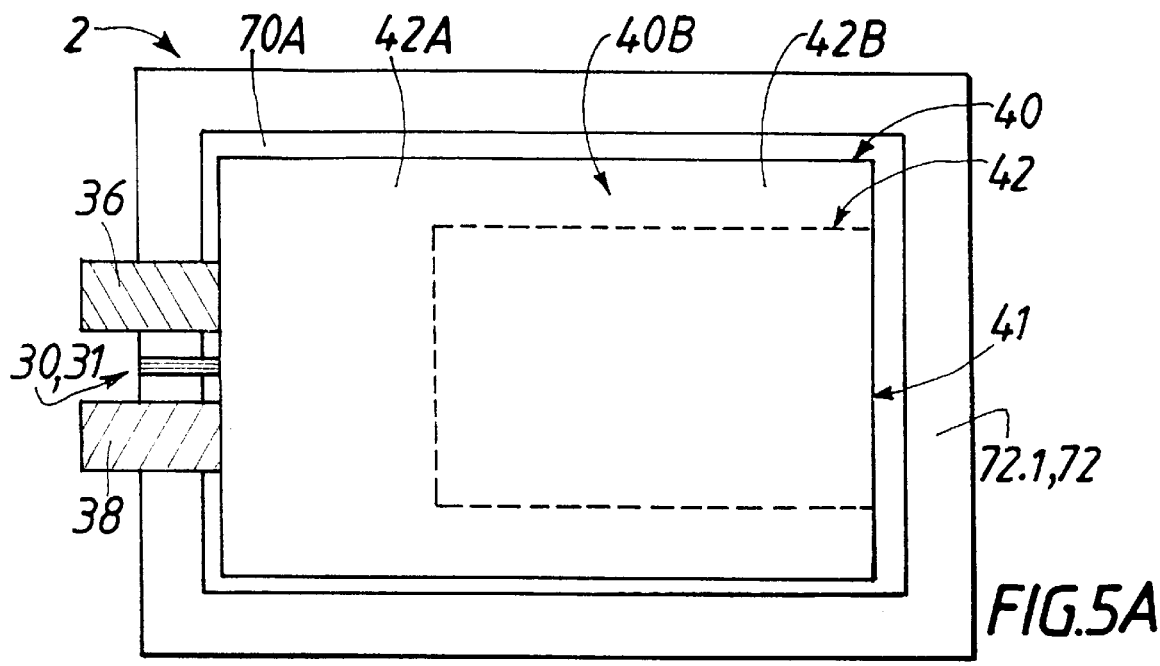
FIG. 5A is a plan view of a thin card including a battery element having a folded envelope, before sealing.
Figure 6A:
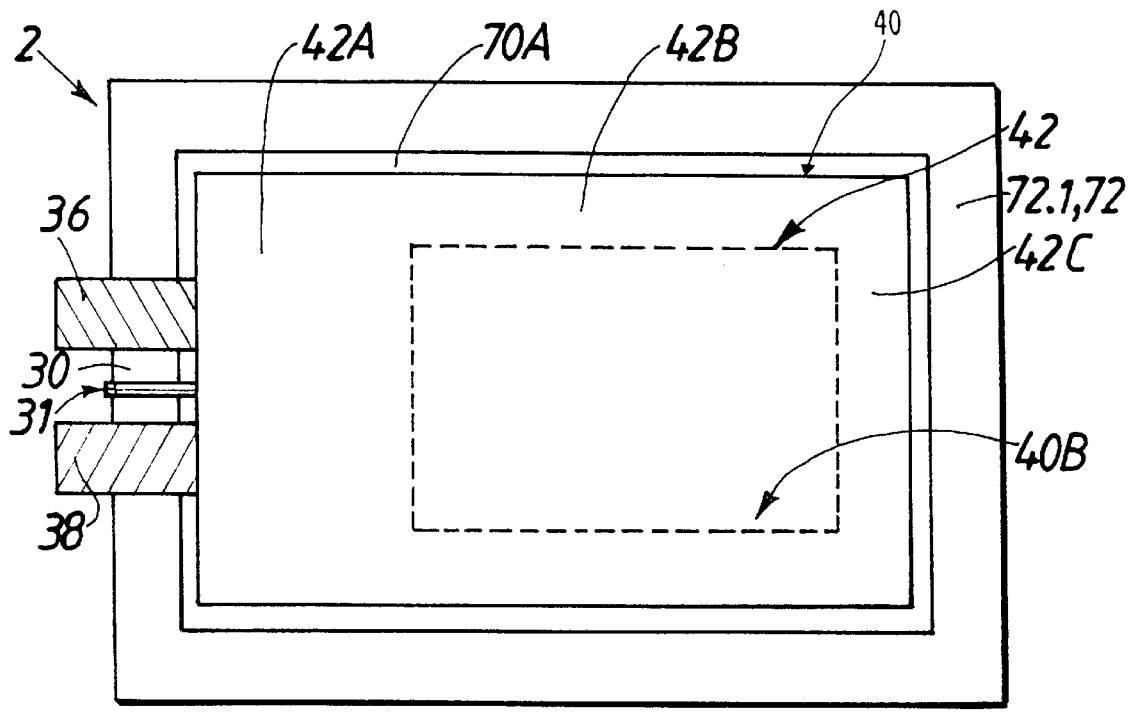
FIG. 6A is a plan view of a thin card including a battery element having a pinched envelope, before sealing.
Figure 6B:
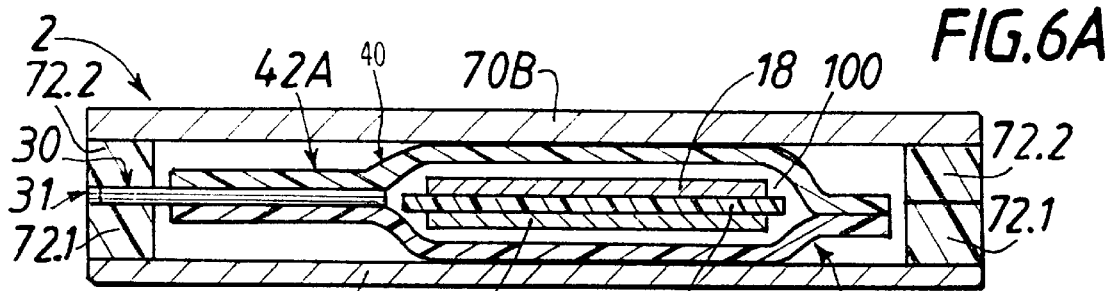
FIGS. 6B and 6C show this thin card after sealing by means of joints in a sectional view along the exhaust and a sectional view along the contact zone, respectively.
Figure 6C:
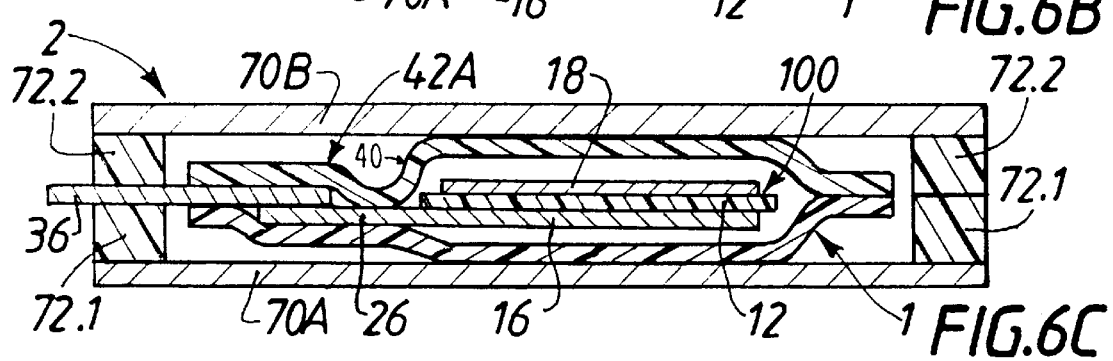
Figure 6D:
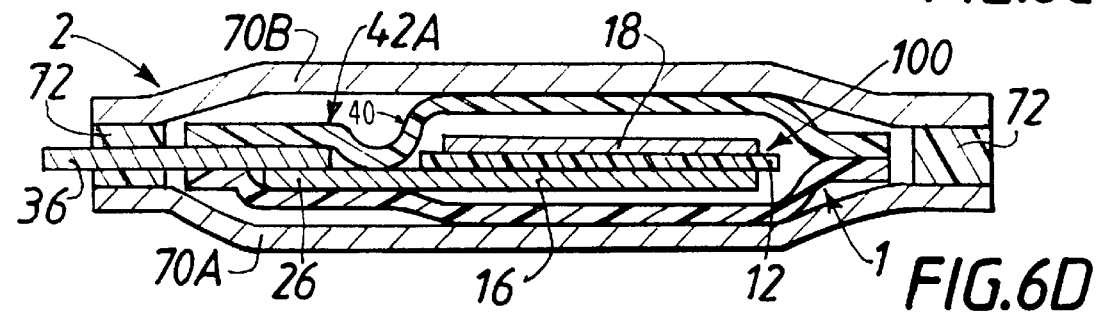
FIG. 6D shows this thin card after sealing by means of an adhesive in a sectional view along a contact zone.

FIGS. 5A and 6A are plan views, before sealing, of the thin card 2 which comprises a passage zone for the exhausts 30, 31 and passage zones for the strips 36, 38 which will then serve as external electric contacts.

Figure 5B:
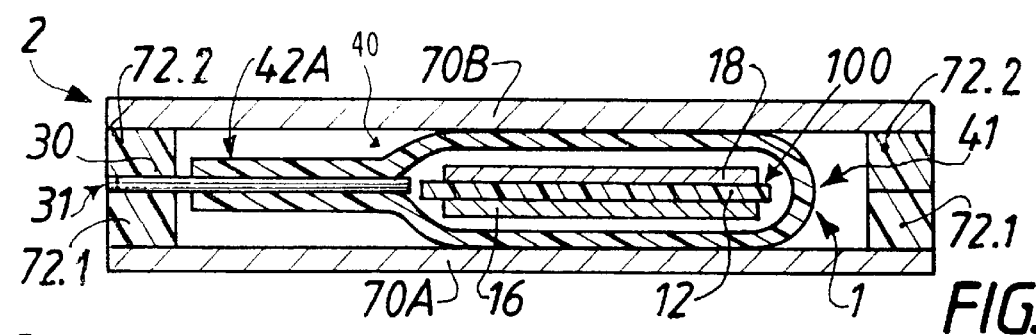
FIGS. 5B and 5C show the thin card of FIG. 5A after sealing by means of joints in a sectional view along the exhaust and a sectional view along a contact zone, respectively.

FIGS. 5B to 5D and 6B to 6D are cross-sectional views of the battery element which is sandwiched and compressed between the first and second cover foils 70A, 70B. To this end, the cover foils 70A, 70B can be connected together at their periphery by means of two peripheral joints 72.1, 72.2 which are sealed to each other as shown in FIG. 5B in a cross-sectional view along a contact lug provided with a strip. The cover foils may be alternatively connected by means of an adhesive or by means of a single joint 72 as shown in FIGS. 7C–7E.

The cover foils 70A, 70B may consist of a semi-rigid insulating material such as acrylonitrile butadiene styrene (ABS) or a polyvinyl chloride (PVC). The adhesive joints 72.1, 72.2, 72 may be of the polysiloxane (silicon) type.

Figure 5C:
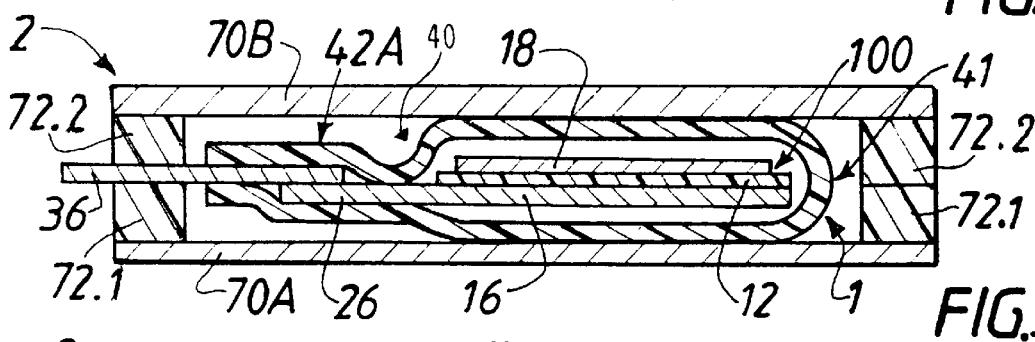
Figure 5D:
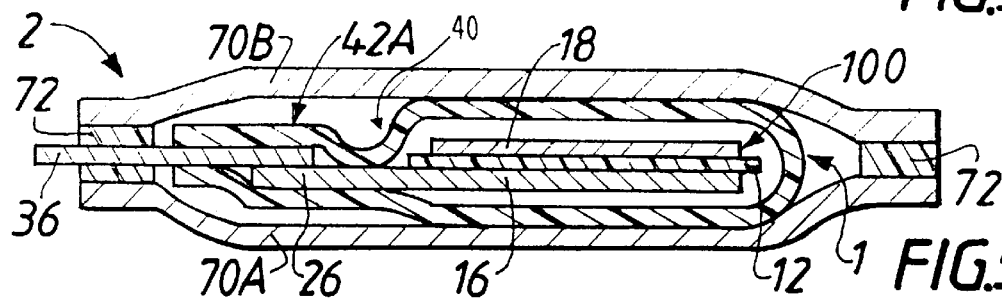
FIG. 5D shows the thin card of FIG. 5A after sealing by means of an adhesive in a sectional view along a contact zone.

FIGS. 5A–5C correspond to a battery element 1 having an envelope of the folded type, and FIGS. 6A–6D correspond to a battery element 1 having an envelope of the all-round sealed pinched type. The thin cards 2 for these battery elements 1 are substantially the same.

FIG. 7A is a plan view and FIG. 7B is a cross-sectional view, along a strip 36, of the strips 36, 38 of the battery element 1 which may be lengthened by means of contact pins 56, 58, respectively. As shown in FIGS. 7A and 7B, where FIG. 7B is the cross-sectional view along the lower strip 36 of FIG. 7A, the lower contact pin 56 extends toward one periphery of the envelope 40 to form the lower strip 36. The lower strip 36 folds at fold 46 and extends back toward the center of the envelope 40 to go over the lower electrode 16. The embodiment shown in FIG. 7B is similar to that shown in FIGS. 1B and 3C. In particular, the lower strip 36 shown in FIGS. 1B and 3C curves back toward the center of the envelope 40 to form the lower contact pin 56 shown in FIGS. 7B and 7A.

Figure 7F:
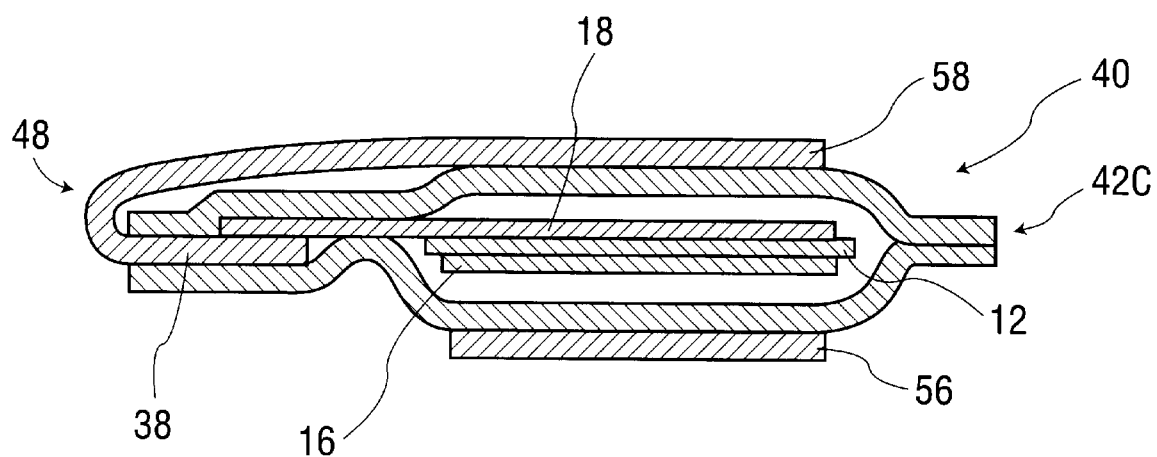
FIG. 7F shows a cross sectional view of the battery shown in FIG. 7A along the upper contact strip.

FIG. 7F shows the cross-sectional view along the upper strip 38 of FIG. 7A, where the upper contact pin 58 extends toward one periphery of the envelope 40 to form the upper strip 38. The upper strip 38 folds or curves at fold 48 to contact the upper electrode 18 and extends back toward the center of the envelope 40. The embodiment shown in FIG. 7F is similar to that shown in FIG. 1C. In particular, the upper strip 38 shown in FIG. 1C curves back toward the center of the envelope 40 to form the upper contact pin 58 shown in FIGS. 7F and 7A. The strips 36, 38 may be lengthened by means of contact pins 56, 58 which are just extensions of these strips for the purpose of a better contact.

The contact pins 56, 58 may also be conducting layers provided on the lower and upper pelts 40A and 40B of tie envelope 40. In this case, the bent strips extend as far as the pins 56, 58 for establishing the contact. This embodiment is not specifically illustrated and is derived from FIG. 7A, plan view, and FIG. 7B, sectional view, considering that in the zones 56, 58 the strips 36, 38 and the pins 56, 58 already realized on the parts 40A, 40B are superimposed.

FIGS. 7C to 7E show the thin card 2 in which there is a cooperation between the means for pressure exerted by the cover foils and the means for connecting the strips or the contact pins to external electric contact means for electrically charging and discharging the battery element 1.

FIG. 7C shows these external contact means using the pressure for making contact with the strips or the pins constitute by pieces 56, 50, 66 and 58, 52, 68, respectively. These pieces comprise a layer 56, 58 which is directly in pressure contact with the strips or the pins and are substantially arranged in the central part of the cover foils 70A, 70B. These pieces comprise a base 50, 52 crossing the cover foils 70A, 70B without imperviousness being necessary, and an external contact layer 76, 78. FIG. 7C shows by way of example that the cover foils 70A, 70B, which may be of a semi-rigid insulating material, maintain the pressure on the walls of the battery element. These foils are connected by means of a joint 72 at their periphery. The exhaust 30, 31 (not shown) may pass through this joint 72 and exit at the exterior of the periphery of the card 2.

In FIGS. 7D and 7E, the cover foils are now denoted by the reference numerals 80, 82 and consist of a conducting material. They make direct contact by way of pressure on the bent strips or on the pins 56, 58. These cover foils 80, 82 thus serve as external contacts for charging and discharging the battery element 1. They are connected by means of a joint 72 or by more or less thick adhesive means, as is shown in FIGS. 7D and 7E, but nevertheless have adequate thicknesses to exert a pressure on the parts 40A, 40B of the battery element 1, which parts are also referred to as walls 40A, 40B, all this establishing an excellent electric contact with the strips or pins 56, 58, respectively.

The scaling of synthetic materials to each other or to metals is well-known to those skilled in the art from the publication: "Plastic Engineering Handbook", Society of Plastics Industry Inc., 3rd edition, Reinhold Book Corporation, New York, USA.

The synthetic material cover foils may be extruded to form a film which may subsequently be laminated. The metallic cover foils are available in various thicknesses in the form of flat strips and may be cut up in the same way as the synthetic material films. The parts of the joint 72 may be made of a silicon type strip or may be perforated from a synthetic material foil consisting of a synthetic material film with the aid of a punch whose shape depends on the shape desired for the battery element. The thickness of the joint generally depends on the thickness of the battery element arranged in the cavity formed by the joint.

Certain synthetic materials have the property that they can be hot-sealed to metallic surfaces without using an adhesive or without necessitating any other pretreatment than a cleaning operation. In certain cases, a pretreatment of the metal is necessary. Certain insulating materials for realizing the joint 72 require an adhesive for sealing the synthetic material to the metal. Epoxy resins or acrylic glues are suitable as adhesives for sealing the synthetic materials to each other.

In a different embodiment, which may be advantageous for regulating the pressure on the semiconducting element, one of the cover foils of die thin card 2 may be removable. In this case, it is only fixed to a joint 72 by mechanical fixation means such as, for example, small screws. Such mechanical means may also be used to fix it to the other cover foil via a joint.

Figure 8A:
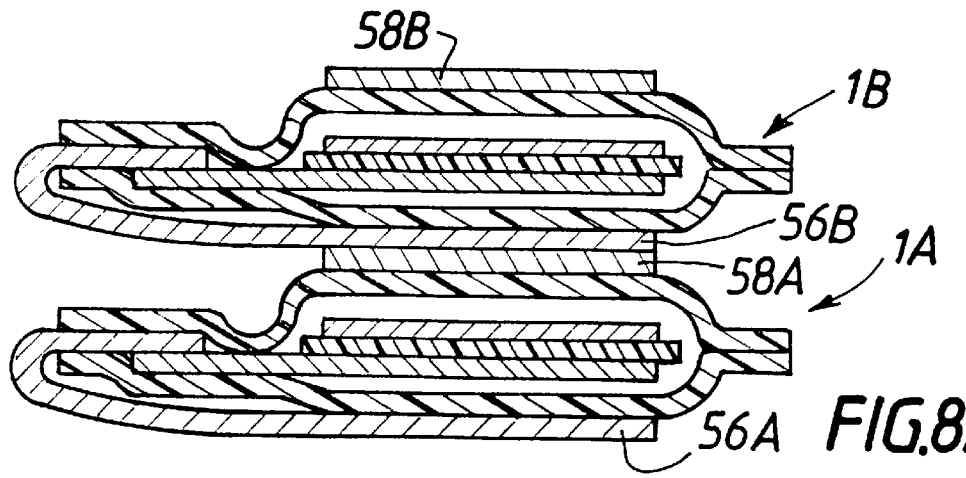
FIG. 8A shows two series arranged battery elements in accordance with FIG. 7B.

In FIG. 8A, two battery elements 1A, 1B as described hereinbefore are arranged in series for supplying a higher voltage. In a variant, which is not shown, these elements may be arranged in parallel for supplying a higher capacity. For the series or parallel arrangement, two battery elements as described with reference to FIG. 7B are preferred, which may be in the form of a folded envelope or a pinched envelope, and are provided one on top of the other by means of pins or strips of different polarities for the series arrangement or pins or strips of the same polarity for the parallel arrangement. For example, for a series arrangement, the pin 58A of the battery element 1A is in contact with the pin 56B of the battery element 1B.

As described hereinbefore., these elements 1A, 1B must also be submitted to a pressure exerted on the walls 40A, 40B (FIGS. 7B–7E) of the envelopes, or pouches.

Figure 8B:
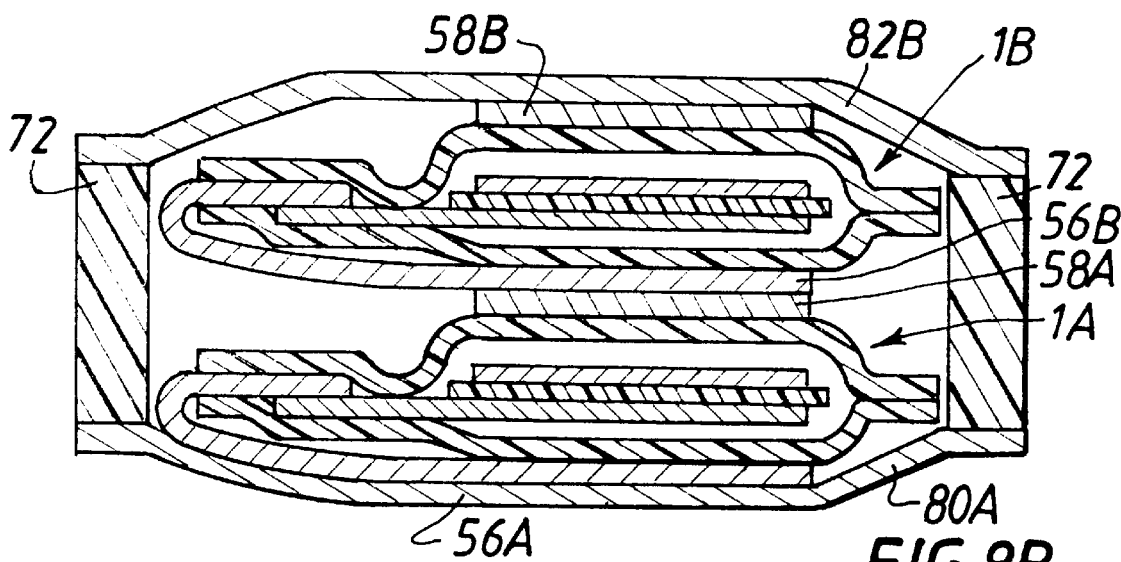
FIG. 8B shows a thin card including two series-arranged battery elements in accordance with FIG. 8A.

To this end, two coupled battery elements 1A, 1B shown in FIG. 8B may be mounted in a thin card of one of the types described hereinbefore. For coupling the battery elements 1A, 1B in conformity with FIG. 7B, the thin card is preferably the card described with reference to FIG. 7E, i.e. it comprises first and second cover foils 80A, 82B of a conducting material connected at their periphery by a joint or an adhesive 72 which allows passage for the exhausts associated with each of the battery elements 1A, 1B.

Figure 8C:
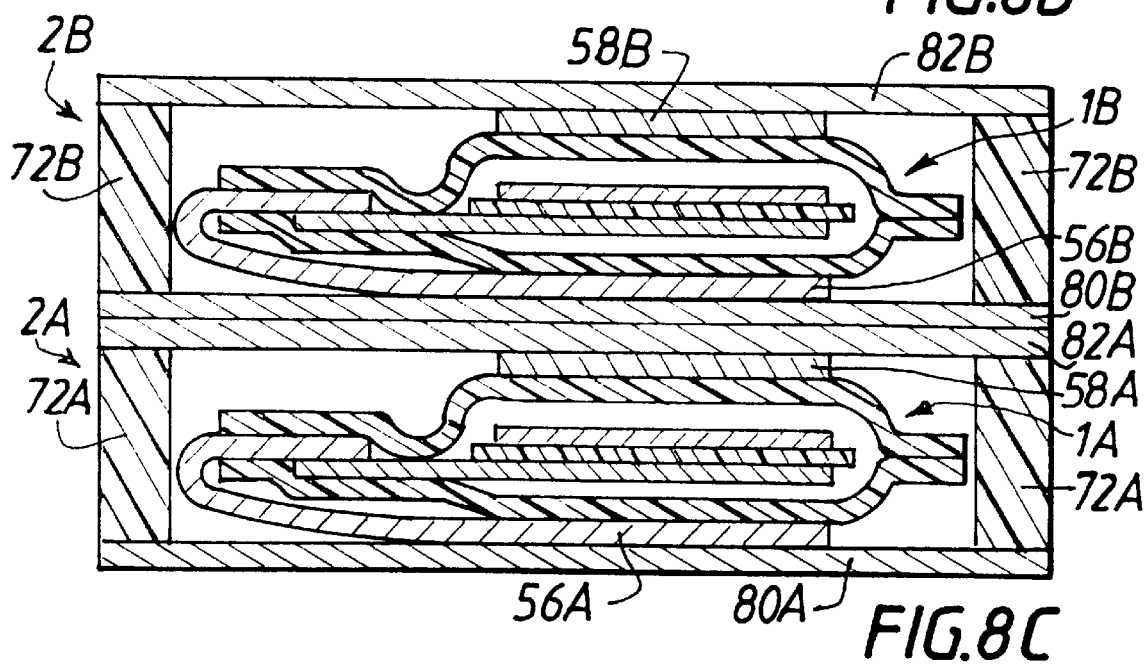
FIG. 8C shows two series-arranged thin cards in accordance with FIG. 7D.

In another embodiment, each battery element 1A, 1B is placed in an individual thin card 2A, 2B and the external contact means of these cards are connected in series or in parallel. As is shown in FIG. 8C, the thin cards 2A, 2B are preferably of the type described with reference to FIG. 7D, with their cover foils of die appropriate polarizes contacting each other. The thin cards may be simply contacted, or fixed to each other. The external contacts for charging and discharging are established by the external cover foils 80A, 82B in the embodiment shown in FIG. 8C.

I claim:

1. A flat battery element comprising:

a cell having an electrolyte and electrodes with contact zones;

conductive strips which contact said contact zones; and an envelope having an insulating film which seals the cell and includes a passage which allow passage of said contact zones to contact said conductive strips and prevent contact of said conductive strips with said electrolyte;

said conductive strips curving over said envelope to form contact pins over said envelope;

said envelope having upper and lower walls which are sealed together at a periphery thereof except at portions forming said passage.

2. A battery assembly comprising a predetermined number of the flat battery elements as claimed in claim 1, said predetermined number of the flat battery elements being superimposed over each other and being connected in series or in parallel.

3. A thin battery comprising:

a cell having an electrolyte and electrodes;

an envelope having an insulating film which seals said cell and sealingly allows passage of outer portions of said electrodes to outside said cell; and contacts located over said envelope, said contacts extending to one side of said envelope to form strips which curve around said one side to contact said outer portions.

4. A battery assembly comprising a predetermined number of the thin batteries as claimed in claim 3, said predetermined number of the thin batteries being superimposed over each other and being connected in series or in parallel.

5. A battery element comprising:

a cell having an electrolyte and electrodes;

an envelope having an insulating film, said envelope having an inner part and an outer part, said inner part sealing said cell, wherein said envelope sealingly allows passage of outer portions of said electrodes from said inner part to said outer part; and contacts located over said envelope, said contacts curving around said envelope and entering said outer part of said envelope to contact said outer portions of said electrodes.

6. A battery assembly comprising a predetermined number of the battery elements as claimed in claim 5, said predetermined number of the flat battery being superimposed over each other and being connected in series or in parallel.

* * * * *